United States Patent
Satoh

[19]

[11] Patent Number: 5,907,990
[45] Date of Patent: Jun. 1, 1999

[54] BRAKE BOOSTER HAVING A REACTION FORCE MECHANISM

[75] Inventor: Tohru Satoh, Saitama-Ken, Japan

[73] Assignee: Jidosha Kiki Co., Ltd., Tokyo, Japan

[21] Appl. No.: 08/940,188

[22] Filed: Sep. 30, 1997

[30] Foreign Application Priority Data

Oct. 25, 1996 [JP] Japan .................................. 8-300977

[51] Int. Cl.$^6$ .................................................. F15B 9/10
[52] U.S. Cl. ........................................................ 91/369.2
[58] Field of Search ................................ 91/369.2, 369.3

[56] References Cited

U.S. PATENT DOCUMENTS

| | | | |
|---|---|---|---|
| Re. 26,487 | 11/1968 | French ................................... | 91/369.2 |
| 3,110,031 | 11/1963 | Price ..................................... | 91/369.2 |
| 4,572,055 | 2/1986 | Schiel ................................... | 91/369.2 |
| 4,719,842 | 1/1988 | Gautier ................................. | 91/369.2 |
| 4,756,231 | 7/1988 | Kobayashi et al. .................. | 91/369.2 |
| 5,425,302 | 6/1995 | Levrai et al. ........................ | 91/369.2 |
| 5,609,087 | 3/1997 | Horikoshi . | |

FOREIGN PATENT DOCUMENTS 299628  4/1992  Germany ................................ 91/369.2

*Primary Examiner*—F. Daniel Lopez
*Attorney, Agent, or Firm*—Flynn, Thiel, Boutell, & Tanis, P.C

[57] ABSTRACT

An improvement of a reaction transmitting mechanism for a booster is disclosed. A spring charged to a preset load is disposed between a stepped end face of value body and a plunger plate to urge the latter forwardly. This separates the plunger plate and a value plunger from each other in the inoperative condition of the booster. As an input shaft is driven forward to operate the booster, a reaction disc bulges into abutment against the plunger plate. Subsequently when the spring is compressed, the plunger plate abuts against the value plunger, which defines a jumping point. From this point on, a reaction from the output is transmitted to a driver. Since the output upon the jumping is determined by the preset load to which the spring is charged, a variation in the output upon jumping is minimized for any variation in the hardness of the reaction disc.

12 Claims, 3 Drawing Sheets

BRAKE BOOSTER HAVING A REACTION FORCE MECHANISM

FIELD OF THE INVENTION

The invention relates to a booster, and more particularly, to an improvement of a reaction transmitting mechanism thereof.

DESCRIPTION OF THE PRIOR ART

A booster is known in the art which comprises a substantially tubular valve body slidably disposed within a shell, a valve plunger slidably fitted in the valve body and mechanically connected to an input shaft, a plunger plate slidably fitted in the valve body at a location forwardly of the valve plunger, an output shaft having its rear end slidably mounted on the valve body, and a reaction disc disposed between said end of the output shaft and the plunger plate, the arrangement being such that a reaction from an output acting upon the output shaft is transmitted to the input shaft through the reaction disc, the plunger plate and the valve plunger.

In a conventional booster as mentioned above, the plunger plate and the reaction disc are separated from each other while the plunger plate and the valve plunger are disposed in abutment against each other when the booster is inoperative. As the input shaft is driven forward to operate the booster, the reaction disc is axially compressed, whereby the axial portion of the reaction disc bulges toward the plunger plate. Accordingly, the reaction disc abuts against the plunger plate to provide a given servo ratio from the output shaft. The abutment of the reaction disc against the plunger plate causes a reaction acting upon the output shaft to be transmitted to the input shaft through the reaction disc, the plunger plate and the valve plunger. The output rises rapidly at the point when the reaction disc abuts against the plunger plate, such a rapid rise in the output being commonly referred to as a jumping.

In a conventional booster as mentioned, a disadvantage is recognized in the art that an output upon the jumping varies largely depending on a spacing between the reaction disc and the plunger plate when the booster is inoperative or the hardness of rubber which constitutes the reaction disc.

SUMMARY OF THE INVENTION

In view of the foregoing, in a booster including a substantially tubular valve body slidably disposed within a shell, a valve plunger slidably fitted in the valve body and mechanically connected to an input shaft, a plunger plate slidably fitted on the valve body at a location forwardly of the valve plunger, an output shaft having its rear end slidably mounted on the valve body, and a reaction disc disposed between said end of the output shaft and the plunger plate so that a reaction from an output acting upon the output shaft is transmitted to the input shaft through the reaction disc, the plunger plate and the valve plunger, in accordance with the invention, a spring charged to a preset load is disposed between the valve body and the plunger plate for urging the plunger plate forwardly, so that when the booster is inoperative, the plunger plate is urged toward the reaction disc, thus maintaining the plunger plate and the valve plunger spaced from each other.

With the described arrangement, when the input shaft is driven forward under the inoperative condition to operate the booster, the reaction disc is axially compressed. Accordingly, the axial portion of the reaction disc bulges rearward to urge the plunger plate rearwardly. When the force with which the plunger plate is urged rearwardly exceeds the preset load which is charged in the spring, the latter is compressed, whereupon the plate plunger abuts against the valve plunger. In other words, this point defines a jumping, and subsequently a reaction from an output acting upon the output shaft is transmitted to the input shaft through the reaction disc, the plunger plate and the valve plunger.

In this manner, with the arrangement described above, the value of the output upon the jumping can be determined by the preset load to which the spring is charged. Accordingly, a variation in the output upon the jumping can be minimized if there is a variation in the spacing between the plunger plate and the reaction disc when the booster is inoperative or the hardness of rubber which forms the reaction disc.

Above and other objects, features and advantages of the invention will become apparent from the following description of several embodiments thereof with reference to the attached drawings.

DETAILED DESCRIPTION OF THE EMBODIMENTS

Figure 1:
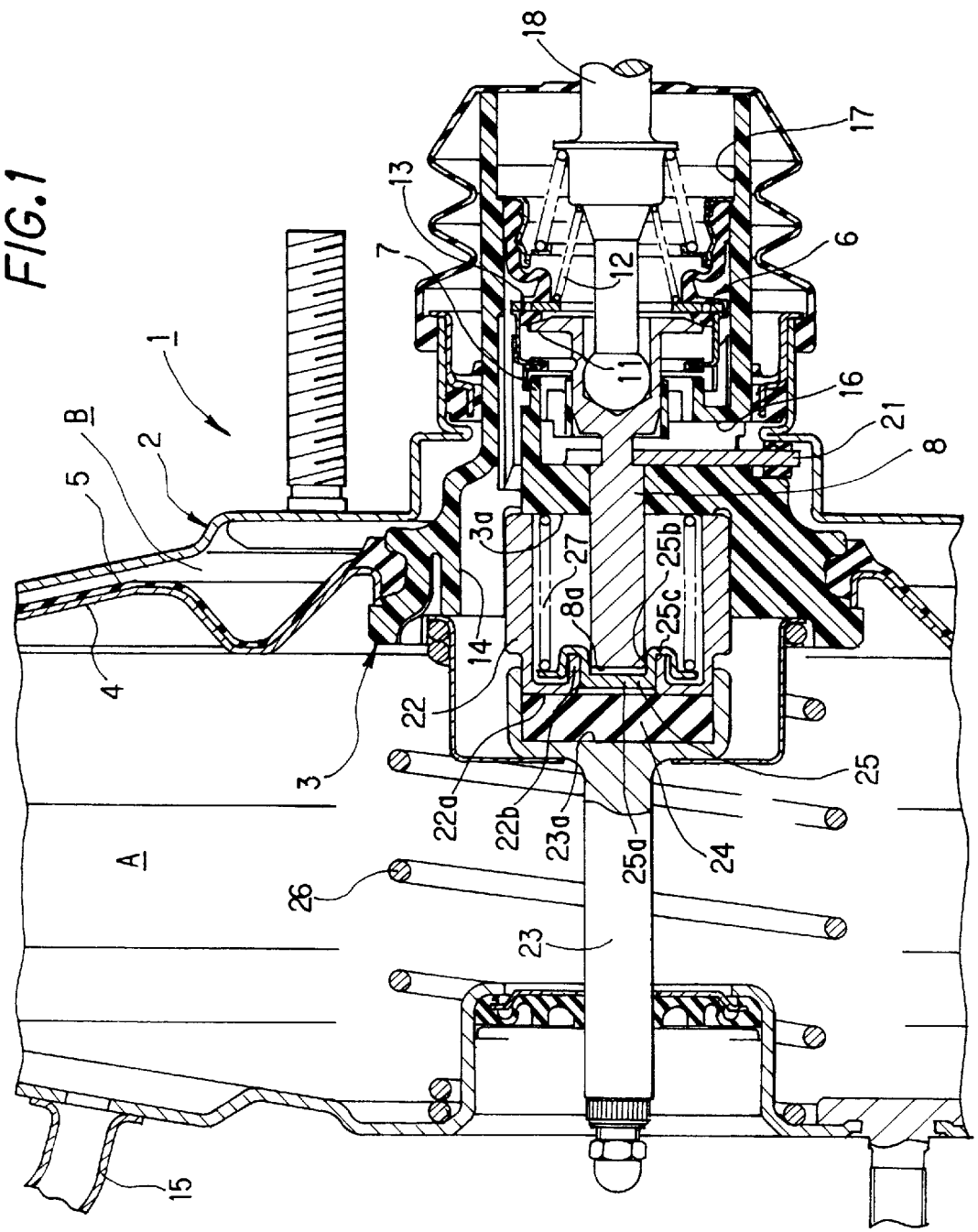
FIG. 1 is a longitudinal section of one embodiment of the invention.

Referring to the drawings, several embodiments of the invention will now be described. Referring to FIG. 1, a brake booster 1 includes a shell 2 in which a substantially tubular valve body 3 is slidably disposed. A power piston 4 is mounted around the outer periphery of the valve body 3, and a diaphragm 5 is applied to the back surface of the power piston, and the combination of the power piston and the diaphragm divides the interior of the shell 2 into a forwardly located, constant pressure chamber A and a rearwardly located, variable pressure chamber B.

The valve body 3 contains a valve mechanism 6 which switches a fluid circuit and which is known in itself. The valve mechanism 6 comprises an annular first valve seat 7 which is formed around the inner periphery of the valve body 3, a valve plunger 8 which is slidably fitted into the valve body 3, an annular second valve seat 11 which is formed around the rear end of the valve plunger 8, and a valve element 13 which is adapted to be seated upon either valve seat 7 or 11 under the resilience of a spring 12.

A space located radially outward of the first valve seat 7 communicates with the constant pressure chamber A through an axial constant pressure passage 14 formed in the valve body 3, and the constant pressure chamber A communicates with an intake manifold of an engine through a tubing 15 connected to the front wall surface of the shell 2, thus normally introducing a negative pressure into the constant pressure chamber A. A space located intermediate the first valve seat 7 and the second valve seat 11 communicates with the variable pressure chamber B through a radial variable passage 16 formed in the valve body 3. Finally, a space located radially inward of the second valve seat 11 communicates with the atmosphere through a pressure passage 17 formed in the valve body 3.

The rear end of the valve plunger 8 is pivotally connected with a distal end of an input shaft 18, the other end of which is coupled to a brake pedal, not shown. The valve plunger 8 is engaged by a key member 21, which prevents the valve plunger 8 from being withdrawn from the valve body 3. When the brake booster 1 is inoperative, part of the key member 21 which is located outside the valve body 3 is disposed in abutment against a rear wall surface of the shell 2, thus maintaining the key member 21 and the valve plunger 8 at an advanced position with respect to the valve body 3. In this manner, a lost motion of the input shaft 18 when the operation of the brake booster 1 is initiated is reduced.

A substantially cylindrical sleeve 22 is fitted into the front end of the valve body 3 around its inner periphery while maintaining a hermetic seal. The front end of the sleeve 22 projects forwardly beyond the front end face of the valve body 3. The sleeve 22 substantially forms part of the valve body 3.

An output shaft 23 has a recess 23a formed in its one end, which recess is slidably fitted around the outer periphery of the sleeve 22 at its front end. A disc-shaped reaction disc 24 is received within the recess 23a, and is interposed between the front end face 22a of the sleeve 22 and the bottom of the recess 23a in the output shaft 23. The front end of the output shaft 23 is coupled to a piston of a master cylinder, not shown, which is connected to a front wall surface of the shell 2.

A plunger plate 25 is slidably disposed within the sleeve 22 and interposed between the reaction disc 25 and the valve plunger 8. As a consequence, when the input shaft 18 is driven forward to operate the brake booster 1, a reaction from an output acting upon the output shaft 23 is transmitted to the input shaft 18 through the reaction disc 24, the plunger plate 25 and the valve plunger 8.

The valve body 3 and the power piston 4 are urged rearwardly by a return spring 26 to be maintained in an inoperative position shown where the key member 21 abuts against the rear wall surface of the shell 2. In this inoperative condition, the valve element 13 is removed from the first valve seat 7 and is seated upon the second valve seat 11.

In the present embodiment, an improvement of the plunger plate 25 is provided so that the plunger plate 25 is urged forwardly by a spring 27 in order to reduce a variation in the output upon the jumping.

Specifically, in the present embodiment, the plunger plate 25 comprises a flat end face 25a which is situated radially centrally, a tubular portion 25b extending rearwardly from the outer periphery of the end face 25a, and a stepped radial portion 25c which extends radially outward from the rear end of the tubular portion 25b.

On the other hand, the sleeve 22 which is disposed in surrounding relationship with the plunger plate 25 comprises a front end face 22a, and an inner tubular portion 22b which extends rearwardly from the inner periphery of the front end face 22a.

The tubular portion 25b of the plunger plate 25 is slidably fitted over the inner tubular portion 22b of the sleeve 22, and the spring 27 mentioned above is disposed between the radial portion 25c of the plunger plate 25 which assumes the position shown and an opposing stepped end face 3a of the valve body 3 and is charged to a preset load. The plunger plate 25 is normally urged toward the reaction disc 24, which is disposed forwardly thereof, under the resilience of the spring 27. In the inoperative condition of the brake booster 1 shown in FIG. 1, the radial portion 25c of the plunger plate 25 which is urged by the spring 27 abuts against the rear end (a stop) of the tubular portion 22b of the sleeve 22. Under this condition, the end face 25a of the plunger plate 25 is slightly spaced from the opposing reaction disc 24. The end face 25a of the plunger plate 25 is also slightly spaced from the front end face 8a of the valve plunger 8.

Describing the operation of the booster mentioned above, as a brake pedal is depressed under the inoperative condition shown, its coupled input shaft 18 and the valve plunger 8 are driven forward, thus operating the valve mechanism 6 to introduce the atmosphere into the variable pressure chamber B in the same manner as in the prior art. A pressure differential between the negative pressure in the constant pressure chamber A and the atmosphere which is introduced into the variable pressure chamber B drives the valve body 3 and its associated members forward. In this manner, the brake booster 1 is operated. At this time, the front end face 8a of the valve plunger 8 is located close to, but is slightly spaced from the end face 25a of the plunger plate 25. The end face 25a of the plunger plate 25 is also spaced from the reaction disc 24.

When the brake booster 1 is operated in this manner, the reaction disc 24 is axially compressed between the bottom of the recess 23a in the output shaft 23 and the end face 22a of the sleeve 22, whereby the axial portion of the reaction disc 24 bulges rearward into abutment against the end face 25a of the plunger plate 25 even though it has been spaced from the latter before.

As the axial portion of the reaction disc 24 farther bulges rearward, the plunger plate 25 is urged rearward. When the force with which the plunger plate 25 is urged rearward becomes greater than the preset load to which the spring 27 is charged, the radial portion 25c of the plunger plate 25 is removed from the end (stop) of the tubular portion 22b of the sleeve 22, whereupon the end face 25a of the plunger plate 25 abuts against the end face 8a of the valve plunger 8.

Figure 2:
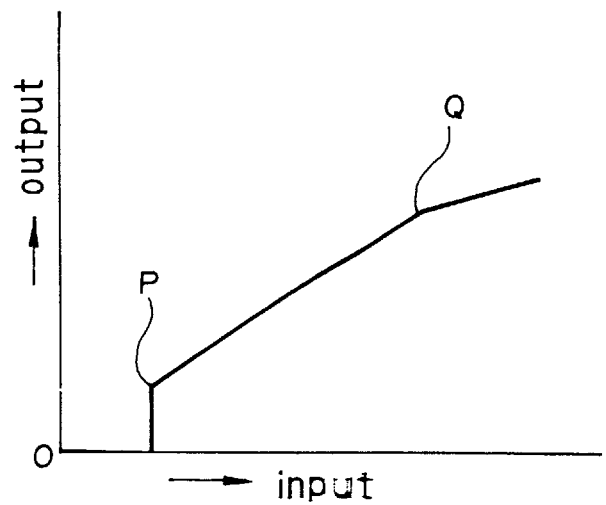
FIG. 2 graphically shows a response curve illustrating a relationship between an output and an input in the embodiment shown in FIG. 1.

This point in time is indicated by P in FIG. 2, and after this point, a reaction from the output acting upon the output shaft 23 is transmitted to the input shaft 18 and hence to the driver through the reaction disc 24, the plunger plate 25 and the valve plunger 8. The point P shown in FIG. 2 is commonly referred to as a jumping point since then the output rises rapidly.

Subsequent to the jumping point P, as the force (an input) with which a brake pedal is depressed increases, the output rises in accordance with a given servo ratio which is determined by the ratio of the area of the end face 22a of the sleeve 22 which is contacted by the reaction disc 24 and the area of the end face 25a of the plunger plate 25 contacted by the reaction disc 24 until a full load point Q is reached. Subsequent to the full load point Q, the output rises at the servo ratio which provides a ratio of input to output of 1:1.

When the brake pedal is released, the brake booster 1 returns to its inoperative condition shown through a reverse procedure from the operation mentioned above.

It will be seen that in the present embodiment, a jumping occurs after the spring 27 which is charged to a preset load is compressed, and accordingly a variation in the magnitude of the output which is obtained upon jumping can be minimized if the hardness of rubber used to form the reaction disc 24 or a spacing between the reaction disc 24 and the end face 8a of the valve plunger 8 in the inoperative condition of the booster varies.

When it is desired to change the output upon the jumping, it is necessary to change the preset load to which the spring 27 is charged. However, there is no need to change the plunger plate 25. Thus, the plunger plate 25 of a single design can be used, thus contributing to suppression of an increase in the cost.

If the rubber which is used to form the reaction disc 24 is subject to an aging effect, a resulting variation of the output upon the jumping which may occur as a result of the aging of the reaction disc 24 can be reduced since the jumping occurs subsequent to the compression of the spring which is charged to the preset load.

Alternatively, rather than relying on the hardness of the reaction disc 24, the spring constant of the spring 27 may be modified to adjust the hysteresis or a difference between the inputs when the brake pedal is depressed and when it is released for obtaining the same output.

Second Embodiment

Figure 3:
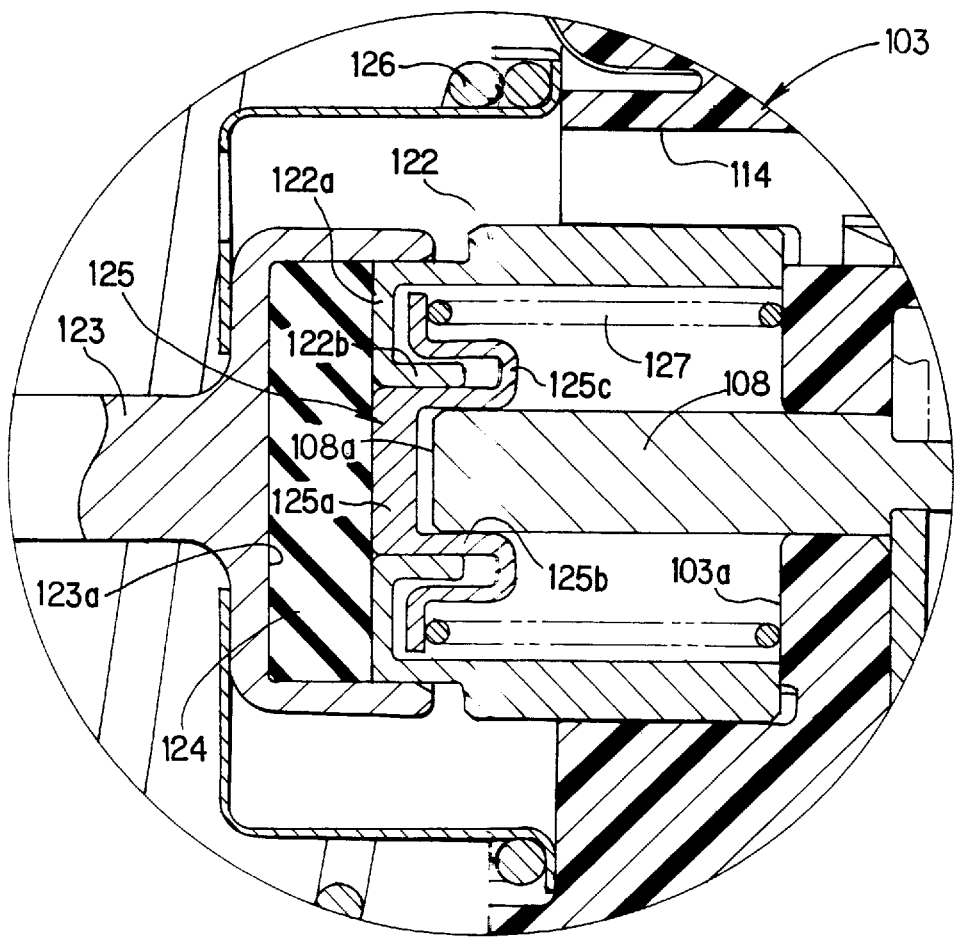
FIG. 3 is a longitudinal section of part of a second embodiment of the invention.

FIG. 3 shows a second embodiment of the invention where a plunger plate 125 has a tubular portion 25b of an increased axial length than that shown in the first embodiment. With this construction, in the inoperative condition of the brake booster shown, a radial portion 125c of the plunger plate 125 is spaced from an end (stop) of the tubular portion 122b of a sleeve 122, and an end face 125a of the plunger plate 125 abuts against a reaction disc 124. The end face 125a of the plunger plate 125 is spaced from a front end face 108a of a valve plunger 108 in the similar manner as mentioned above in connection with the first embodiment.

In other respects, the arrangement is similar to the first embodiment, and accordingly, corresponding parts are designated by like reference numerals and characters as used in describing the first embodiment, to which 100 is added. The second embodiment also achieves a similar functioning and effect as described above in connection with the first embodiment.

Third Embodiment

Figure 4:
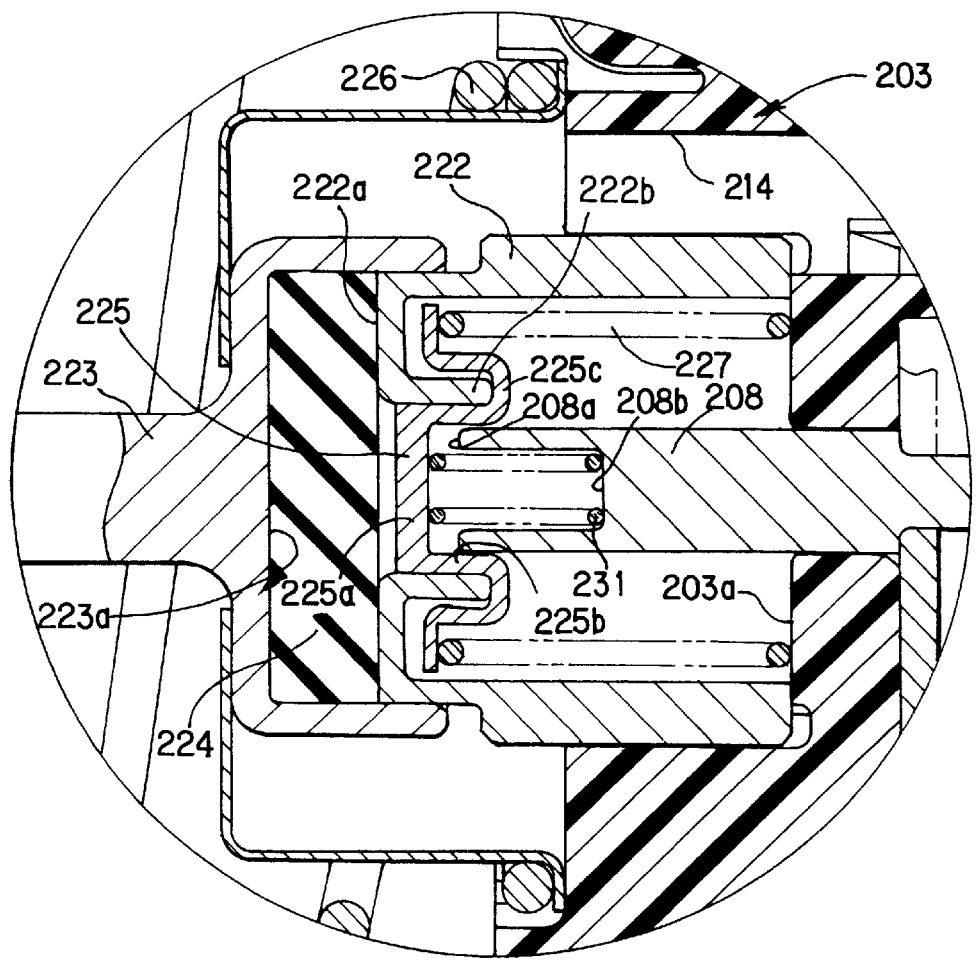
FIG. 4 is a longitudinal section of part of a third embodiment of the invention.

FIG. 4 shows a third embodiment of the invention. The third embodiment is similarly constructed as the first embodiment with modifications that a recess 208b is formed in an end face 208a of a valve plunger 208, in its axial region, and that a second spring 231 is disposed between the recess 208b and its opposing end face 225a of a plunger plate 225. It is to be noted that the second spring 231 is charged to a preset load which is less than the preset load to which an outwardly located spring 227 is charged. In other respects, the arrangement is similar to the first embodiment, and accordingly, corresponding parts are designated by like reference numerals and characters as used in the first embodiment to which 200 is added.

Describing the operation of the third embodiment, when a brake pedal is depressed in the inoperative condition shown, its associated valve plunger 208 is driven forward, whereby the brake booster is operated in the similar manner as occurs in the first embodiment. While the second spring 231 is compressed as the valve plunger 208 is driven forward, at this point in time, the front end face 208a of the valve plunger 208 is located close to, and is slightly spaced from the end face 225a of the plunger plate 225, and the end face 225a of the plunger plate 225 is also spaced from a reaction disc 224.

When the brake booster is operated in this manner, an axial portion of the reaction disc 224 bulges rearwardly, as mentioned previously in connection with the first embodiment, and is then brought into abutment against the end face 225a of the plunger plate 225, from which it had been spaced before.

As the axial portion of the reaction disc 224 farther bulges rearward, the plunger plate 225 is urged rearward, and when the force with which the plunger plate 25 is urged rearward exceeds the preset load to which the spring 227 is charged, a radial portion 225c of the plunger plate 25 moves away from an end (a stop) of a tubular portion 222b of a sleeve 222.

Figure 5:
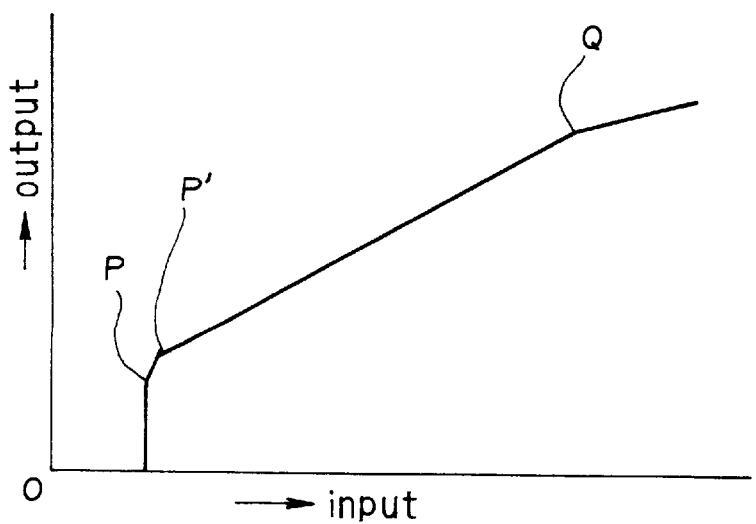
FIG. 5 graphically shows a response curve illustrating a relationship between an output and an input according to the embodiment shown in FIG. 4.

At this point in time, the end face 225a of the plunger plate 225 is not in abutment against the end face 208a of the valve plunger 208. In other words, a jumping point P shown in FIG. 5 is reached when the radial portion 225c of the plunger plate 225 moves away from the end (stop) of the tubular portion 222b of the sleeve 222. Thus, subsequent to the jumping point P, a reaction from the output acting upon an output shaft 223 is transmitted to a driver through the reaction disc 224, the plunger plate 225, the second spring 231, the valve plunger 208 and an input shaft 218.

Immediately after the jumping point P shown in FIG. 5, the second spring 231 is compressed rapidly, and in response thereto, the end face 225a of the plunger plate 225 abuts against the end face 208a of the valve plunger 208, which occurs at a point P' shown in FIG. 5. Subsequent to the point P', the output rises in accordance with a given servo ratio which is determined by the ratio of the area of the end face 222a of the sleeve 222 contacted by the reaction disc 224 and the area of the end face 225a of the plunger plate 225 contacted by the reaction disc 224 until a full load point Q is reached.

During an interval from the jumping point P to another point P' which immediately follows it, a reaction from the output acting upon the output shaft 223 is transmitted to the valve body 203 and to the valve plunger 208 through the springs 227 and 231 which urge the plunger plate 225. Accordingly, a servo ratio in this interval is determined by the ratio of the preset loads to which the springs 227 and 231 are charged, respectively. In the present embodiment, the preset load to which the spring 231 is charged is by a given value less than the preset load to which the spring 227 is charged. As a consequence, a servo ratio which prevails in the interval from the jumping point P to point P' is greater than the servo ratio which prevails subsequent to the point P' where the end face 225a of the plunger plate 225 has abutted against the end face 208a of the valve plunger 208.

In this manner, a brake feeling experienced by the driver is improved at the jumping point and during an interval which immediately follows it.

In addition, it will be seen that the third embodiment achieves the similar functioning and advantage as mentioned above in connection with the first embodiment.

While the foregoing description of the embodiments illustrated the application of the invention to a brake booster of a single type, it should be understood that the invention is also applicable to a brake booster of tandem type or a booster of triple type in which three sets of constant pressure chambers and variable pressure chambers are provided within a shell. In addition, the invention is also applicable to a clutch booster.

While the invention has been disclosed above in connection with several embodiments thereof, it should be understood that a number of changes, modifications and substitutions therein are possible without departing from the spirit and scope of the invention defined by the appended claims.

What is claimed is:

1. A brake booster including a substantially tubular valve body slidably disposed within a shell, a valve plunger slidably fitted in the valve body and coupled to an input shaft, a plunger plate slidably fitted within the valve body at a location forwardly of the valve plunger, an output shaft having its rear end slidably mounted on the valve body, a reaction disc disposed between said end of the output shaft and the plunger plate, the plunger plate being operative interposed between, and preventing direct contact between, the reaction disc and the valve plunger, a reaction from an output acting upon the output shaft being transmitted to the input shaft through the reaction disc, the plunger plate and the valve plunger, and a spring which is charged to a preset load and disposed between the valve body and the plunger plate for urging the plunger plate forwardly, the booster having an inoperative condition in which the plunger plate is urged toward the reaction disc to maintain the plunger plate and the valve plunger spaced from each other, the booster having an operative condition in which the preset load of the spring is overcome, the reaction disc contacts the plunger plate, and thereby the plunger plate contacts the valve plunger.

2. A booster according to claim 1 in which in the inoperative condition of the booster, the end face of the plunger plate abuts against the reaction disc.

3. The brake booster according to claim 1, wherein the plunger plate separates the valve plunger from the reaction disc.

4. A booster comprising a substantially tubular valve body slidably disposed within a shell, the valve body having a front end and a stepped end face, a valve plunger slidably fitted in the valve body and coupled to an input shaft, a plunger Plate slidably fitted within the valve body at a location forwardly of the valve plunger, the plunger plate comprising an end face which is situated radially centrally and which has an outer periphery, a tubular portion extending rearward from the outer periphery of the end face, and a radial portion extending radially outward from the rear end of the tubular portion, a sleeve being fitted into the front end of the valve body around its inner periphery to form part thereof, the plunger plate being slidably fitted within the sleeve, the valve plunger having a front end slidably fitted into the tubular portion of the plunger plate from the rear side, an output shaft having its rear end slidably mounted on the valve body, and a reaction disc disposed between said rear end of the output shaft and the plunger plate, the output shaft transmitting an output reaction to the input shaft through the reaction disc, the plunger plate and the valve plunger, a spring charged to a preset load and disposed between the valve body and the plunger plate for urging the plunger plate forwardly, the spring being disposed between the radial portion of the plunger plate and the opposing stepped end face of the valve body, the booster having an inoperative condition in which the plunger plate is urged toward the reaction disc to maintain the plunger plate and the valve plunger spaced from each other.

5. A booster according to claim 4 in which in the inoperative condition of the booster, the radial portion of the plunger plate abuts against a stop on the sleeve, whereby the end face of the plunger plate is spaced from the reaction disc.

6. A booster according to claim 5 in which the end face of the valve plunger which opposes the end face of the plunger plate is formed with a recess, a spring which is charged to a preset load less than the preset load to which the first mentioned spring is charged being disposed between the recess and the end face of the plunger plate.

7. The brake booster according to claim 4, wherein a radially outward portion of said reaction disc contacts a rear face of the sleeve, in the operative condition the radially outward portion is compressed by said rear face of the sleeve and a radially inward portion of said reaction disc contacts a forward side of said end face of the plunger plate, and upon overcoming the preset load a rearward side of said end face of the plunger plate and said end face of said valve plunger contact each other.

8. The booster according to claim 2, wherein the sleeve has a forward end, the sleeve forward end has a radially inwardly extending portion and an axially rearwardly extending portion attached to the radially inwardly extending portion, the tubular portion of the plunger plate is slidably fitted over the axially rearwardly extending portion.

9. A booster according to claim 8, wherein in the inoperative condition of the booster, the radial portion of the plunger plate abuts against a stop on the sleeve, and the end face of the plunger plate is spaced from the reaction disc.

10. A booster according to claim 9, wherein the end face of the valve plunger which opposes the end face of the plunger plate is formed with a recess, a spring which is charged to a preset load less than the preset load to which the first mentioned spring is charged being disposed between the recess and the end face of the plunger plate.

11. A booster according to claim 8, wherein in the inoperative condition of the booster, the end face of the plunger plate abuts against the reaction disc.

12. The brake booster according to claim 8, wherein a radially outward portion of said reaction disc contacts a rear face of the sleeve, in the operative condition the radially outward portion is compressed by said rear face of the sleeve and a radially inward portion of said reaction disc contacts a forward side of said end face of the plunger plate, and upon overcoming the preset load a rearward side of said end face of the plunger plate and said end face of said valve plunger contact each other.

* * * * *

UNITED STATES PATENT AND TRADEMARK OFFICE
CERTIFICATE OF CORRECTION

PATENT NO. : 5,907,990
DATED : June 1, 1999
INVENTOR(S) : Tohru SATOH

It is certified that error appears in the above-identified patent and that said Letters Patent is hereby corrected as shown below:

Column 7, line 4; replace "operative" with ---operatively---.

Column 7, line 29; replace "Plate" with ---plate---.

Column 7, line 33; after "the" (second occurrence) insert ---plunger plate---.

Column 7, line 38; after "end" insert ---face---.

UNITED STATES PATENT AND TRADEMARK OFFICE
CERTIFICATE OF CORRECTION

PATENT NO. : 5,907,990

DATED : June 1, 1999

INVENTOR(S) : Tohru Satoh

It is certified that error appears in the above-identified patent and that said Letters Patent is hereby corrected as shown below:

Column 8, line 9; after "a" (second occurrence) insert ---second---.

Column 8, line 10; after "a" insert ---second---.

Column 8, line 22; replace "2" with ---4---.

Column 8, line 34; after "a" (second occurrence) insert ---second---.

Column 8, line 35; after "a" insert ---second---.

Column 8, line 38; replace "inoperative" with ---operative---.

Signed and Sealed this

Eighteenth Day of July, 2000

Attest:

Q. TODD DICKINSON

*Attesting Officer*  *Director of Patents and Trademarks*